Feb. 7, 1950 M. L. TUCKER 2,496,830
WATER SWIVEL FOR DIAMOND DRILLS
Filed July 17, 1946
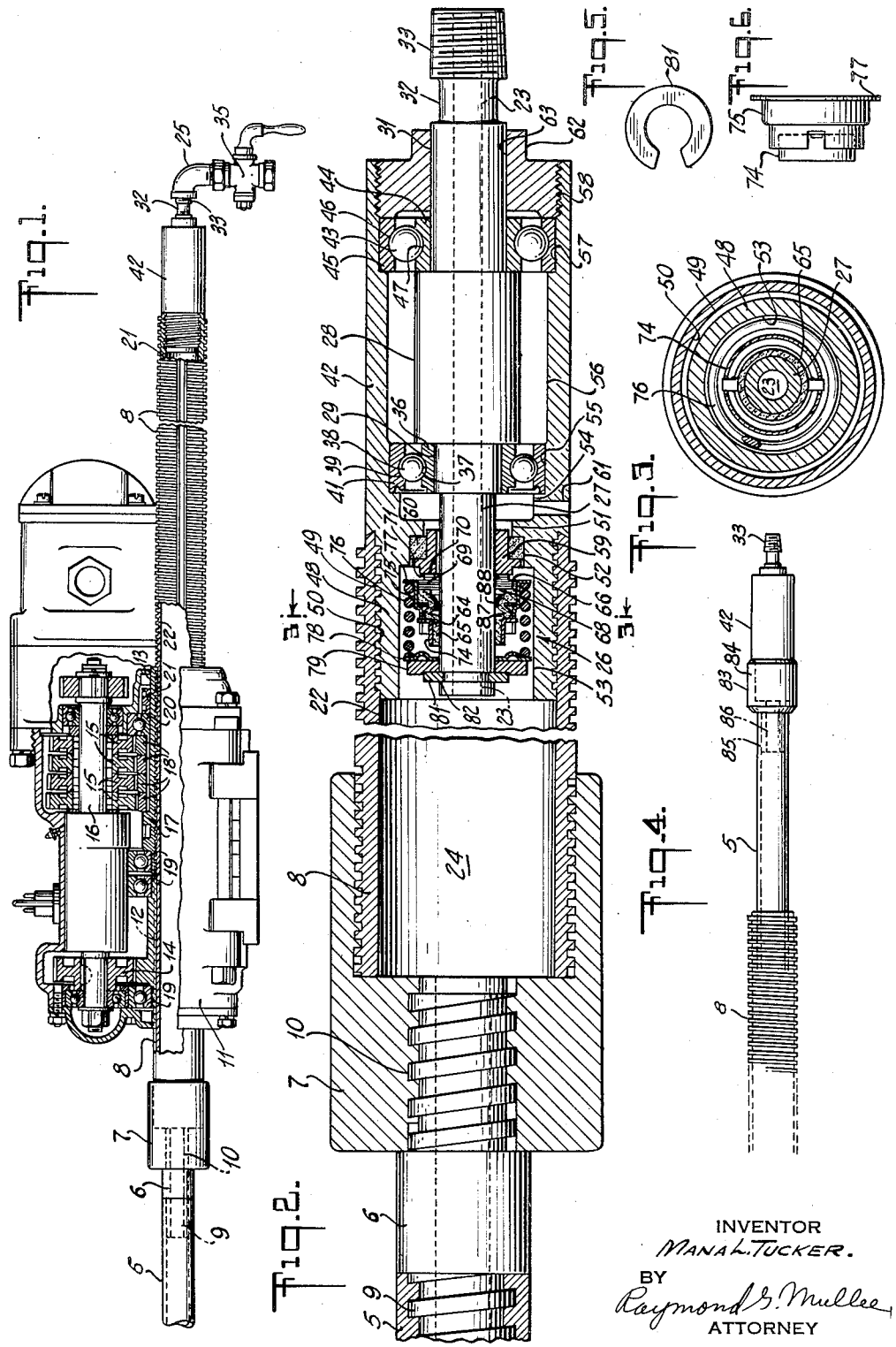
INVENTOR
MANA L. TUCKER.
BY
Raymond G. Mullee
ATTORNEY Patented Feb. 7, 1950

2,496,830

UNITED STATES PATENT OFFICE 2,496,830

WATER SWIVEL FOR DIAMOND DRILLS

Mana L. Tucker, Detroit, Mich., assignor to Chicago Pneumatic Tool Company, New York, N. Y., a corporation of New Jersey Application July 17, 1946, Serial No. 684,305

3 Claims. (Cl. 255—47)

This invention relates to a swivel joint and more particularly to the type of joint used in high speed diamond drilling to conduct water under high pressure from a supply pipe to a hollow drill rod assembly.

An object of the invention is to provide a water swivel assembly which will connect a fluid supply hose or similar conduit and the feed screw or drill rod assembly of a rotary diamond drill in an efficient manner while maintaining the tubular shaft in the swivel assembly in axial alignment with the feed screw or a drill rod so that the fluid seal of the assembly will operate with full effectiveness.

A further object is to reduce or eliminate leakage in a fluid seal in a water swivel assembly by the rigid maintenance of the tubular shaft of the swivel assembly in axial alignment with the axis of the feed screw or drill rod thereby preventing pivoting of the shaft which may cause the fluid tight sealing surfaces between the rotatable and stationary parts of the fluid seal to become worn or unseated with reference to each other.

Another object of the invention is to provide a durable fluid conducting swivel joint that is constructed to withstand hard usage and thereby minimize leakage through the rotatable elements of a fluid seal forming part of the swivel assembly.

Other objects and structural details of the invention will appear in the specification and will be apparent from the accompanying drawing, in which:

Fig. 1 is a side view of the drilling apparatus, partly in longitudinal section, showing the countershaft, feed screw drive, feed screw, drill rod and coupling, water swivel, and water supply connection;

Fig. 2 is an enlarged side view, in longitudinal section, of the water swivel in association with the fluid seal and the feed screw, and of the feed screw in connection with the drill rod and drill rod coupling;

Fig. 3 is a transverse section taken on the line 3—3 in Fig. 2 and on the same scale as Fig. 2;

Fig. 4 is a reduced side view of a modification of the invention showing the water swivel coupled to a drill rod section;

Fig. 5 is a detail view of the split retaining ring shown in Fig. 2; and

Fig. 6 is a detail view of two reinforcing sleeves associated with the fluid seal.

Referring now more particularly to the drawing, the invention is shown in connection with a rotary diamond drill. Drill rod section 5 is connected by two coupling units 6 and 7 to a feed screw 8. Coupling 6 has an externally threaded forward end portion 9 adapted to be screwed into the drill rod section 5, and an externally threaded rear end portion 10 adapted to be screwed into the coupling 7. Coupling 7 is formed with a threaded bore in its rear portion adapted to receive the forward end of the feed screw 8. As the feed screw 8 rotatably advances, as hereinafter described, corresponding motion is transmitted to the drill rod section thereby causing the diamond core drill at the outer end of the drill rod string (not shown) to bore into the earth formation. After the core drill has advanced a predetermined distance, say two feet, another drill rod section may be added. To do this, coupling 7 is unscrewed from coupling 6 leaving coupling 6 still threadably connected to the drill rod section 5; the feed screw, with coupling 7 remaining in position thereon, is retracted; an additional rod section (not shown) is threaded on to the rear threaded portion 10 of the coupling 6; an additional coupling (not shown) of the same construction as 6 is threaded into the rear internally threaded portion of the newly inserted drill rod section; and the coupling 7 is threadably connected to the rear externally threaded portion of the newly inserted section. The machine is then in position again to continue drilling.

The diamond drill advances into the earth formation with a right turning rotary motion, locking forward. Accordingly, the drill rod sections and the couplings 6 and 7 are provided with right handed threads. The forward end of the feed screw is also formed with a right thread for connection with the coupling 7. The main body of the feed screw, however, is provided with a left thread. Forward motion for drilling is effected by the left threaded feed screw turning in a clockwise direction by means of a mechanism which comprises a driving sleeve 12 and a feed nut 13 surrounding the feed screw rearward of the driving sleeve. Such mechanism is disclosed and claimed in Patent No. 2,331,179, granted to H. O. Fossum, October 5, 1943. Briefly considered, the driving sleeve 12 of such mechanism is driven by transmission gear 14, and the feed nut 13 is driven by a gear selected by the operator from among the speed change gears 15, the transmission gear 14 and the speed change gears 15 being keyed to the countershaft 16. Feed nut 13 is maintained against longitudinal movement along the feed screw by its shoulder 17 which abuts the gear cluster 18 on one side and the thrust bearing 19 on the other. Gear cluster 18 is held axially by bearing 20 and by lock nut 21 engaging the other side of the bearing 20. Driving sleeve 12 is maintained against longitudinal movement along the feed screw in either direction by thrust bearings 19. Each of the speed change gears 15 is adapted to impart to the feed nut a speed greater than that at which the feed screw 8 is turned by the driving sleeve 12 as actuated by gear 14. Consequently, when the mechanism is operating for driving the drill forwardly, the feed nut will tend to move rearwardly in relation to the feed screw. But since the feed nut is maintained against longitudinal movement, the feed screw will advance in the direction of drilling. To retract the feed screw, the feed nut 13 is held against rotation while the feed screw is positively driven as before and in the same direction of rotation.

The feed screw 8 (Fig. 2) is provided with a longitudinal bore 22 which connects at its forward end with the hollow couplings 6 and 7 and the hollow drill rod section 5 and at its rear end with a bore 23 of reduced diameter leading through the water swivel assembly to the supply pipe 25. Water under relatively high pressure is led from the supply pipe 25 through the water swivel bore 23 to the feed screw bore 22 (which serves as a chamber 24) and thence through the hollow couplings 6 and 7 and the hollow drill rod section 5 to the drill bit (not shown). Because of its relatively high pressure, the water will seek to escape from the chamber 24 backwardly through the water swivel assembly; and to prevent such escape, the fluid sealing unit 26 is provided.

The fluid sealing unit 26 is disposed upon the forwardly projecting portion 27 of the central water shaft 28. The central shaft 28 is provided with an intermediate portion 29 of reduced diameter between itself and the forward projecting portion 27 and with a rearwardly projecting portion 31 also of reduced diameter. Such rearward portion 31 merges into a neck 32 which in turn merges at its outward end with a threaded tapered plug 33. Plug 33 is adapted to screw into the supply pipe 25 (Fig. 1) which is connected through the valve 35 with a source of supply (not shown). The intermediate shaft portion 29 has mounted thereon a bearing ring 36 the periphery of which is formed with a race 37 for the ball bearing 38. The ball bearings 38 are retained in position by and rotate upon the outer race 39 which registers with the race 37 and is formed in the bearing ring 41 mounted in the casing 42 of the swivel assembly. The rearward shaft portion 31 is likewise provided with ball bearings 43 rotatable in races 46 and 47 formed in the rings 44 and 45 mounted in the same manner as rings 36 and 41.

The plurality of ball bearings serves not only to minimize friction in the rotation of the casing 42 about the shaft 28, but also to prevent axial displacement of the casing with reference to the shaft and further to maintain the shaft in axial alignment with the casing and the feed screw. The maintenance of such axial alignment is an important feature of the invention, since the failure thereof in swivels in general use results in the pivoting of the swivel shaft which causes wearing out of parts and consequent leakage. This is particularly so where the swivel shaft pivots to the extent that the fluid seal mounted thereon is thrown out of alignment with cooperating bearing elements.

The casing 42 has a forward portion 48 of reduced diameter the periphery of which is provided with a thread 49 to engage an internal thread 50 in the rear end of the feed screw 8. The casing is formed with a bore 51, and counterbores of varying diameters 52, 53, 54, 55, 56, 57 and 58. Counterbore 52 forms a seat for the packing 60 but provides clearance for the sealing ring 59; counterbore 53 forms a chamber for the fluid seal 26; counterbore 54 is formed with a bleeder 61 to permit the escape of leakage from the casing chamber; counterbores 55 and 57 provide shouldered seats for the outer race rings of the ball bearings 38 and 43 respectively so that said bearing assemblies shall function as thrust as well as rotary bearings; counterbore 56 forms a grease chamber around the central portion 28 of the water shaft for the lubrication of the ball bearings 38 and 43; and counterbore 58 is provided with a thread to receive the threaded plug 62. Plug 62 forms a closure for the swivel assembly and has a bore 63 which is machined with a fine finish so that the plug will rotate smoothly upon the rear portion 31 of the water shaft.

The fluid seal 26 is of standard make and may be of the class represented by Patent No. 2,360,372 to R. D. Snyder issued October 17, 1944. Briefly considered, such a fluid seal comprises a resilient sealing member 64 of rubber or rubber substitute such as Neoprene having a forward flange 65 adapted to fit tightly in preloaded condition upon the forward shaft portion 27. The inside diameter of the flange 65 is less than the outside diameter of the shaft projection 27, and because of the resiliency of the member it will fit tightly on the shaft. Extending rearwardly therefrom is a flexible bellows fold forming an integral connection with the rear extremity which has a rear face 66 directly contacting the exposed forward face 68 of the frictional disc 69 and adapted to form a fluid-tight connection therewith. Disc 69 is of material having a low coefficient of friction, such as carbon, or an impregnated fabric, and its rear face 70 is provided with a smooth finish adapted to make a lapped fluid-tight running connection with the face 71 of the metallic sealing ring 59. Ring 59 rotates with the casing while disc 69 remains stationary on the shaft. Packing member 60, which is made of rubber or a rubber substitute such as Neoprene, is inserted between the sealing ring 59 and the casing 42, and is intended to provide a floating seat for the sealing ring 59 so that there may be some slight pivoting of the ring without leakage. To this end, it is to be noted that clearances are provided between the bore of the ring and the shaft and between the periphery of the ring and the casing. Since the seal 64, as previously explained, is tightly fitted upon the shaft and is of resilient material, its rear extremity will tend to expand and thereby exert pressure upon the disc 69 to maintain face 70 of disc 69 in fluid-tight relation with the face 71 of sealing ring 59. To maintain the faces 70 and 71 flush with each other by the continued axial alignment of the members 69 and 59 upon which such faces are formed is essential to prevent leakage and otherwise preserve effective operation of the seal, and it is to this feature that the invention is principally directed.

Sleeves 74 and 75, which are applied to the preloaded sealing member 64, reinforce such member more tightly upon the shaft. Such sleeves are in loosely notched connection to permit of their longitudinal motion relative to the bellows portion of the sealing member 64 so that the member 64 may be expanded or contracted longitudinally along the shaft if desired. Such sleeves also serve to prevent rotation of the seal assembly upon the shaft which might result from the frictional engagement of the ring 59 and the disc 69. Since the flange 65 of seal 64 is tightly premounted upon the shaft and the sleeve 74 is in tight engagement with the flange of the seal, the engagement of sleeve 74 with sleeve 75 will hold the disc 69 against rotation about the shaft. A coil spring 76 is disposed under compression between the flange 77 on the sleeve 75 and the retaining member 78 to prevent longitudinal movement of the sleeves along the shaft 27 after such sleeves have been arranged in desired operative position. Member 78 is held against axial movement by the holding ring 79 which in turn abuts against the split ring 81 (Fig. 5) disposed in the annular recess 82 formed in the periphery of the shaft portion. An annular supporting member 88 is mounted upon the shaft 27 and is disposed within the seal 64. The outer surface of the member 88 is concave to conform to the curve of the fold of the seal 64 and serves as a support to maintain the fold of the seal in predetermined position outwardly from the shaft 27. Disposed around the outer surface of the fold of the seal 64 is a split ring 87 which is sprung into position in assembly to press the fold of the seal into the concave surface of the annular supporting member 88. In conjunction, the member 88 and the ring 87 hold the flexible seal in predetermined position in relation to the shaft 27 and the disc 69 so that the rear extremity of the seal will exert a steady pressure upon the disc 69.

In operation, the feed screw 8 will rotate, as actuated by the power transmission from the countershaft 16, and will advance to the left, as previously described, to drive the diamond drill into the earth formation. The casing 42 will rotate therewith. The ball bearings 38 and 43 will provide for easy rotation of the casing with reference to the shaft 28 and will maintain the shaft 28 with its forward projecting portion 27 and its rear projecting portion 31 in rigid axial alignment with the axis of the feed screw. Since the fluid seal 26 is tightly mounted upon the forward shaft portion 27, the bearing face 70 of the disc 69 will be maintained flush against the forward face 71 of the sealing ring 59, and as the ring 59 rotates with the casing, a fluid-tight running seal will be maintained with the disc 69.

An alternative arrangement of the water swivel is shown in Fig. 4. In this instance the swivel is coupled directly to a drill rod section 5 by means of a coupling 83. Coupling 83 has an internally threaded cup shaped rear portion 84 engaged to the forward threaded portion 49 of the water swivel and an externally threaded forward portion 85 engaged to the internally threaded rear portion of a drill rod section. Coupling 83 is formed with a bore 86 providing a water connection between the swivel and the hollow drill rod. When this method of coupling is used, the drill rod is drivingly connected to the feed screw by a chuck (not shown) and advances with the feed screw during drilling operations.

The form and application of the invention described herein are preferred embodiments of the invention. It is not to be restricted to the specific details set forth, but any modification that may be apparent to those skilled in the art is reserved.

What is claimed is:

1. In a rotary drilling machine a combination comprising a feed screw provided with a longitudinal bore, a casing affixed to an end of said feed screw and adapted to rotate therewith, a shaft having a longitudinal bore and an enlarged external portion forming two shoulders in planes normal to the axis of the shaft, said shaft having a projection extending into the longitudinal bore of said feed screw, ball bearings having inner race members in abutment with said shoulders and arranged within the casing to maintain the enclosed projection of the shaft in axial alignment with said casing, and a fluid seal associated with the shaft and including a sealing disc, and a ring secured to the casing, said ring adapted to rotate with said casing and to cooperate with the sealing disc to maintain a fluid tight seal whereby fluid is restricted from passing from the longitudinal bore of said feed screw and about the exterior of said shaft.

2. In a rotary drilling machine a combination according to claim 1 in which said casing includes an aperture whereby fluid leakage past said fluid seal may be evacuated.

3. In a rotary drilling machine a combination according to claim 2 in which said fluid seal associated with the shaft is located on the projection extending into the longitudinal bore.

MANA L. TUCKER.

REFERENCES CITED

The following references are of record in the file of this patent:

UNITED STATES PATENTS

| Number | Name | Date |
| --- | --- | --- |
| 674,699 | Harwood | May 21, 1901 |
| 1,285,712 | Hughes | Nov. 26, 1918 |
| 1,664,125 | Lowrey | Mar. 27, 1928 |
| 2,331,179 | Fossum | Oct. 5, 1943 |
| 2,331,615 | Meyer | Oct. 11, 1943 |
| 2,394,715 | Phillips | Feb. 12, 1946 |